(No Model.) 2 Sheets—Sheet 1.
F. B. GIESLER.
SYSTEM OF PNEUMATIC MALTING.

No. 475,550. Patented May 24, 1892.

Witnesses
Geo. W. Young
Wm. Klug

Inventor
Franklin B. Giesler
By H. G. Underwood
C. H. Horney (No Model.)

F. B. GIESLER.
SYSTEM OF PNEUMATIC MALTING.

No. 475,550. Patented May 24, 1892.

2 Sheets—Sheet 2.

Witnesses
Geo. W. Young.
Wm. Klug

Inventor
Franklin B. Giesler
By H. G. Underwood
Attorney

UNITED STATES PATENT OFFICE.

FRANKLIN B. GIESLER, OF MILWAUKEE, WISCONSIN, ASSIGNOR TO THE GALLAND-HENNING PNEUMATIC MALTING DRUM MANUFACTURING COMPANY, OF SAME PLACE.

SYSTEM OF PNEUMATIC MALTING.

SPECIFICATION forming part of Letters Patent No. 475,550, dated May 24, 1892.

Application filed March 9, 1891. Serial No. 384,246. (No model.)

*To all whom it may concern:*

Be it known that I, FRANKLIN B. GIESLER, a citizen of the United States, and a resident of Milwaukee, in the county of Milwaukee, and in the State of Wisconsin, have invented certain new and useful Improvements in Systems of Pneumatic Malting; and I do hereby declare that the following is a full, clear, and exact description thereof.

My invention relates to a system of pneumatic malting, and will be fully set forth hereinafter, and subsequently claimed.

Figure 1:
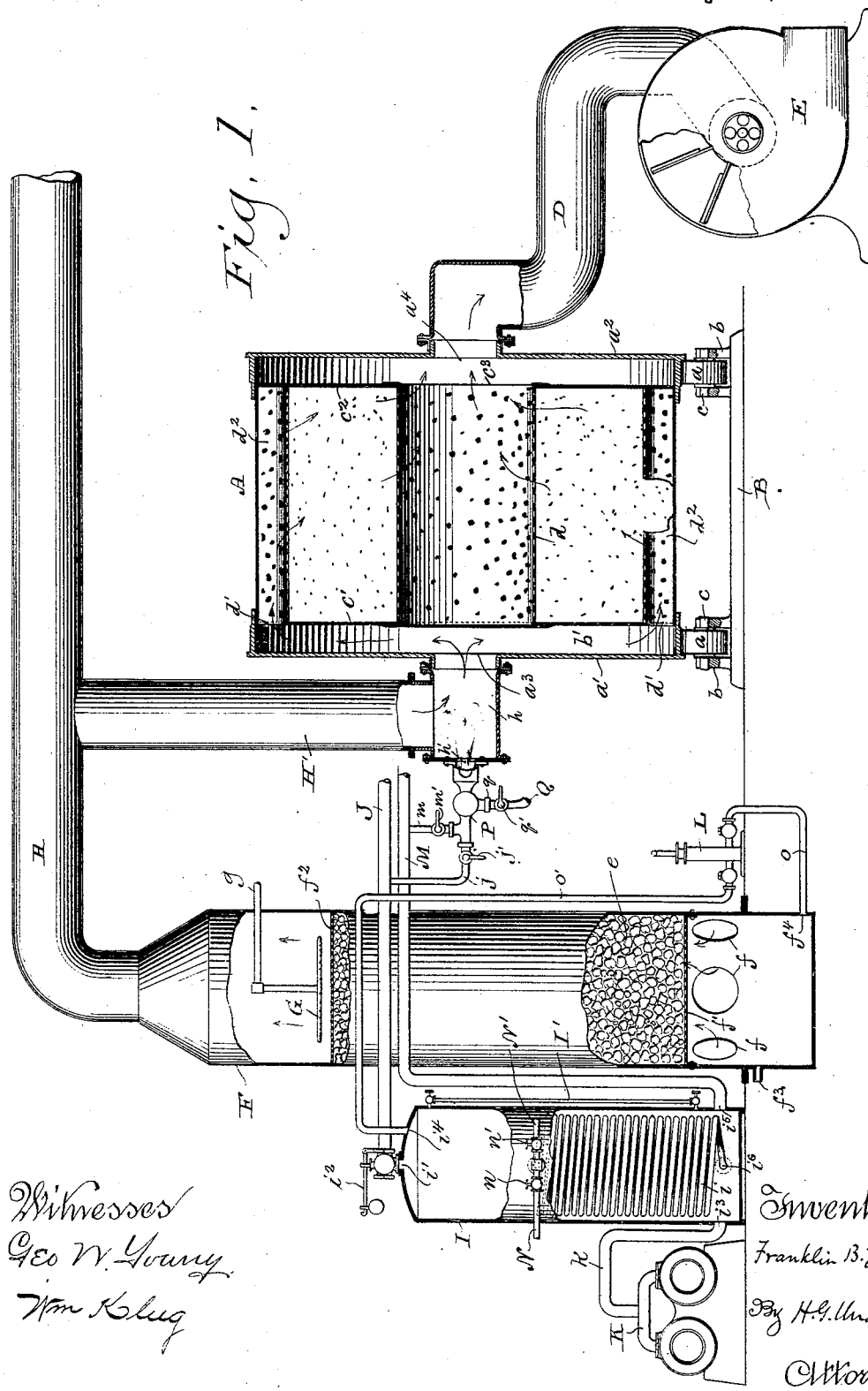
Figure 2:
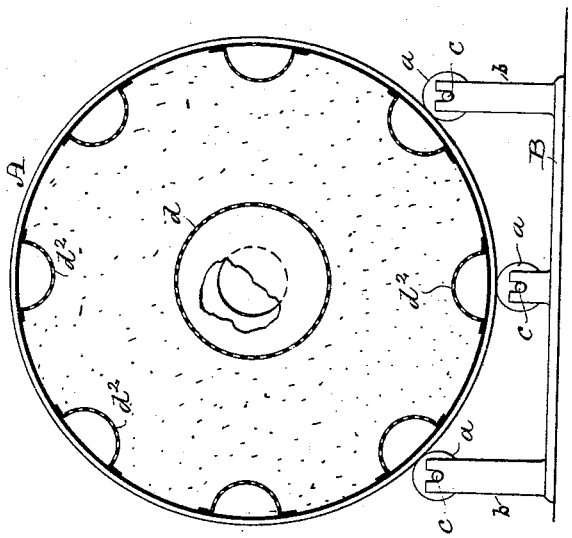
Figure 3:
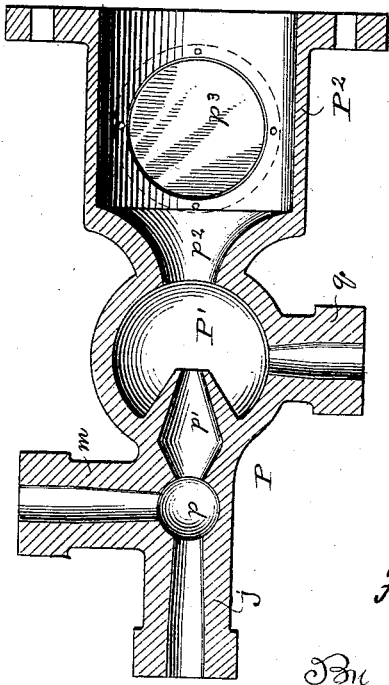

In the drawings, Figure 1 is a partly sectional elevation of apparatus designed to illustrate the carrying out of my system. Fig. 2 is a sectional view of one of the malting-drums employed in connection with my system; and Fig. 3 is an enlarged sectional view of my air, water, and steam mixing chamber and adjacent parts.

A represents a slowly-revolving drum, in which the grain after having been steeped is placed. This drum is mounted on rollers $a\ a$, journaled in standards $b\ b$, rising from a suitable base B, the axles $c$ of said rollers being themselves revolved by any suitable means, (not shown,) so that said drums will make one complete revolution in about forty minutes. These drums have each solid heads $a'\ a^2$ with central openings $a^3\ a^4$, and are provided with rigid interior cylinders of less width than than that of the drums, so as to leave a space $b'$ between the head $a'$ of the drum and the solid partition or head $c'$ of the inner cylinder. On the other side the inner cylinder of each drum has a solid head $c^2$ with a central annular opening $c^3$. A perforated cylinder $d$ extends across the said main inner cylinder, registering with this opening $c^3$, and all around the inner periphery of said main inner cylinder are perforated semi-cylinders $d^2\ d^2$, which have correspondingly-shaped openings $d'\ d'$ into the space $b'$, already described, said semi-cylinders being closed at their other ends by the described solid head $c^2$ of said main inner cylinder. A suction-pipe D leads from the described opening $a^4$ of the drum to a suction-fan E.

F is a coke-tower provided with air-openings $f\ f$ in its lower part, above which is a grate $f'$, while in its upper part is a similar grate $f^2$, the coke $e$ being retained between the two grates. Above the upper grate is a sprinkler G, supplied with water through pipe $g$ from any suitable source. The lower part of the coke-tower is closed and provided with an overflow-pipe $f^3$.

H is a main air-pipe leading from the top of the coke-tower, and H' represents a branch pipe leading to a chamber $h$, communicating with the described opening $a^3$ into the drum A. It will be understood that although I have only shown one drum A in the drawings a series of such is used with the system, each one communicating in the same manner through a branch pipe H' with the described main air-pipe H.

I is a closed chamber provided with a coil $i$, and having an air-outlet $i'$ in its top provided with a safety-valve $i^2$, set to any desired pressure, an air-pipe J leading from said outlet $i'$.

K is an air-pump having a pipe $k$ leading to an inlet $i^3$ in the lower part of chamber I.

In the lower part of the coke-tower F is a water-outlet $f^4$, from which a pipe $o$ leads to a pump L, and from thence another pipe $o'$ leads to a water-inlet $i^4$ in the top of the chamber I. A water-outlet $i^5$ is located in the lower part of the chamber I, from whence there leads a water-pipe M, as hereinafter described. The coil $i$ enters the chamber I above the vertical center thereof, communicating with pipes N and N', which are provided with valves or cocks $n$ and $n'$, respectively, and said coil $i$ passes out of the lower part of said chamber I, as shown at $i^6$.

I' is a water-gage on the outside of the chamber I.

P is the mixing-chamber for air, water, and steam, (shown best in Fig. 3,) with three pipes $j$, $m$, and $q$, which connect, respectively, with air-pipe J, water-pipe M, and steam-pipe Q, said pipes being provided with suitable valves or cocks $j'$, $m'$, and $q'$ adjacent to the said mixing-chamber P, which latter has a spherical chamber $p$ at the junction of the pipes or passages $j$ $m$ for first mixing the compressed air and water from the chamber I, which spherical chamber $p$ communicates with an injector $p'$, projecting into a larger spherical chamber P', the steam pipe or passage $q$ also communicating with this chamber P', which chamber has an outlet $p^2$ in line with the injector $p'$, which outlet increases in size, terminating in the passage P², which is secured to the front wall of the described chamber $h$, said front wall having an opening $h'$ in line with said passage P², which latter has preferably transparent observation-windows $p^3$ in its opposite sides.

In carrying the described system into effect air is pumped into the lower part of the chamber I by pump K through pipe $k$ and inlet $i^3$, and water which passes from the sprinkler G through the coke $e$ in the coke-tower F and falls down to the lower part of said tower is drawn therefrom by pump L through pipe $o$ and forced through pipe $o'$ and inlet $i^4$ into the upper part of the said chamber I, passing down through the air just admitted, which air is compressed in the upper part of said chamber and in the pipe J, and the pressure of the air on this water forces the same out through outlet $i^5$ into pipe M, the safety-valve $i^2$ providing a means of escape for the air when the pressure exceeds the proper limit.

In order to regulate the temperature of the water in pipe M, so that malting can be continuously carried on at all seasons of the year, either a heating or cooling fluid is passed through the coil $i$ in chamber I, and to do this conveniently one pipe, as N, may be connected to a cooling-fluid tank or refrigerating-machine, and the other pipe, as N', with a steam or hot-water tank, and then either the valve $n$ or $n'$ being closed and the other valve opened a cooling or heating fluid, as desired, will pass through the coil $i$ and the water in the chamber I be regulated in temperature, just as desired, before it passes into pipe M. The drum A, containing the grain, is to be understood as being slowly revolved meanwhile, and the suction-fan E, drawing moist purified air through the grain in the drum, as indicated by the arrows in Fig. 1, from the coke-tower F, through pipes H H'. This supply being ordinarily insufficient, the valves $j'$ $m'$ are opened and the air and water under pressure from the pipes J M meet in the part $p$ of the mixing-chamber P and are mixed and forced through the injector $p'$ in the form of a fog or vapor, steam being added through pipe $q$ when necessary, and this in turn mixing with the vaporized air and water from the said injector within the part P' of the mixing-chamber P, and the whole being forced through the passage $p^2$ P² and chamber $h$ into the space $b'$ of the revolving drum A, and by the action of the fan E sucked through the grain in said drum, together with the air from pipe H', as already described. It will thus be seen that the proper regulation of the air as regards temperature and moisture is at all times under the control of the operator by simply turning the several valves $j'$ $m'$ $q'$, as desired, and by circulating either a cooling or a heating fluid through the coil $i$ in the chamber I, as found necessary. It will be understood that the air and water pipes J and M, as well as the steam-pipe Q, extend continuously and communicate by their proper branch pipes $j$, $m$, and $q$ with the mixing-chambers P of each drum, so that only one chamber I and coke-tower F, with their necessary pipes, pumps, and connections, are required for the entire series of malting-drums in the system, and that, similarly, only one suction-fan E is necessary, the same being attached to the last drum A of the series, said drums being properly connected together.

Though I have shown my described system applied to revolving malting-drums, it will be understood that I do not limit myself thereto, but that my invention may be also applied to floor, tank, box, or other malting systems when desired.

Having thus described my invention, what I claim as new, and desire to secure by Letters Patent, is—

In a system of pneumatic malting, the combination, with the series of malt or grain receptacles, a suction-fan, and a coke-tower containing a sprinkler, all connected together by suitable air-pipes, of a chamber provided with air and water inlet and outlet pipes, a coil within said chamber connected with temperature-regulating-fluid pipes, pumps connected with said inlet-pipes, and mixing-chambers for the air and water connected with the outlet-pipes and with the air-pipes leading to said malt or grain receptacles, injectors within said mixing-chambers, and steam-pipes leading into said mixing-chambers, substantially as set forth.

In testimony that I claim the foregoing I have hereunto set my hand, at Milwaukee, in the county of Milwaukee and State of Wisconsin, in the presence of two witnesses.

FRANKLIN B. GIESLER.

Witnesses:
H. G. UNDERWOOD,
FRANK C. MCCUTCHEON.